United States Patent
Khoshnevisan et al.

(10) Patent No.: US 11,690,063 B2
(45) Date of Patent: Jun. 27, 2023

(54) PHYSICAL DOWNLINK SHARED CHANNEL MAPPING TYPE FOR PHYSICAL DOWNLINK SHARED CHANNEL REPETITION IN ONE SLOT

(71) Applicant: QUALCOMM Incorporated, San Diego, CA (US)

(72) Inventors: Mostafa Khoshnevisan, San Diego, CA (US); Peter Gaal, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 185 days.

(21) Appl. No.: 17/248,181

(22) Filed: Jan. 13, 2021

(65) Prior Publication Data

US 2021/0227564 A1  Jul. 22, 2021

Related U.S. Application Data

(60) Provisional application No. 62/962,666, filed on Jan. 17, 2020.

(51) Int. Cl.
*H04W 72/1273* (2023.01)
*H04W 72/0446* (2023.01)
(Continued)

(52) U.S. Cl.
CPC ... *H04W 72/1273* (2013.01); *H04W 72/0446* (2013.01); *H04W 72/23* (2023.01); *H04W 72/53* (2023.01)

(58) Field of Classification Search
CPC ......... H04W 72/1289; H04W 72/0493; H04W 72/0446; H04W 72/042
(Continued)

(56) References Cited

U.S. PATENT DOCUMENTS

2019/0149365 A1* 5/2019 Chatterjee ............. H04L 5/0044
  370/329
2020/0351892 A1* 11/2020 Yi ......................... H04L 5/0044
(Continued)

FOREIGN PATENT DOCUMENTS

EP    3567967 A1    11/2019

OTHER PUBLICATIONS

Apple Inc: "Cross Slot Scheduling for UE Power Saving", 3GPP Draft, 3GPP TSG RAN WG1 #96bis, R1-1904986, Cross Slot Scheduling for UE PowerSaving, 3rd Generation Partnership Project (3GPP), Mobile Competence Centre, 650, Route Des Lucioles, F-06921 Sophia-Antipolis Cedex, France, vol. RAN WG1. No. Xian, China, Apr. 8, 2019-Apr. 12, 2019, Apr. 3, 2019 (Apr. 3, 2019), XP051707360, 9 Pages, Retrieved from the Internet: URL: http://www.3gpp.org/ftp/tsg%5Fran/WG1%5FRL1/TSGR1%5F96b/Docs/R1%2D1904986%2Ezip. [retrieved on Apr. 3, 2019] section 2.1; p. 2.
(Continued)

*Primary Examiner* — Peter G Solinsky
(74) *Attorney, Agent, or Firm* — Harrity & Harrity, LLP

(57) ABSTRACT

Various aspects of the present disclosure generally relate to wireless communication. In some aspects, a user equipment may receive a downlink control information (DCI) communication that schedules a physical downlink shared channel (PDSCH) including a first transmission occasion and a second transmission occasion; and determine a mapping type for the first transmission occasion and a mapping type for the second transmission occasion based at least in part on receiving the DCI communication scheduling the PDSCH including the first transmission occasion and the second transmission occasion. Numerous other aspects are provided.

34 Claims, 9 Drawing Sheets

(51) Int. Cl.
  *H04W 72/23* (2023.01)
  *H04W 72/53* (2023.01)
(58) Field of Classification Search
  USPC .......................................................... 370/329
  See application file for complete search history.

(56) References Cited

U.S. PATENT DOCUMENTS

2020/0389897 A1* 12/2020 Mondal ..................... H04L 1/08
2021/0112583 A1*  4/2021 Gao ....................... H04L 5/0023
2021/0136802 A1*  5/2021 Cirik ..................... H04L 5/0053

OTHER PUBLICATIONS

International Search Report and Written Opinion—PCT/US2021/070041—ISA/EPO—dated May 7, 2021.
Samsung: "Corrections on CA Operation", 3GPP Draft, 3GPP TSG RAN WG1 Meeting #92, R1-1801989, CA Operation, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 26, 2018-Mar. 2, 2018, Feb. 17, 2018 (Feb. 17, 2018), pp. 1-9, XP051397785, Retrieved from the Internet: URL: http://www.3gpp.org/ftp/tsg_ran/WG1_RL1/TSGR1_92/Docs/[retrieved on Feb. 17, 2018].

* cited by examiner

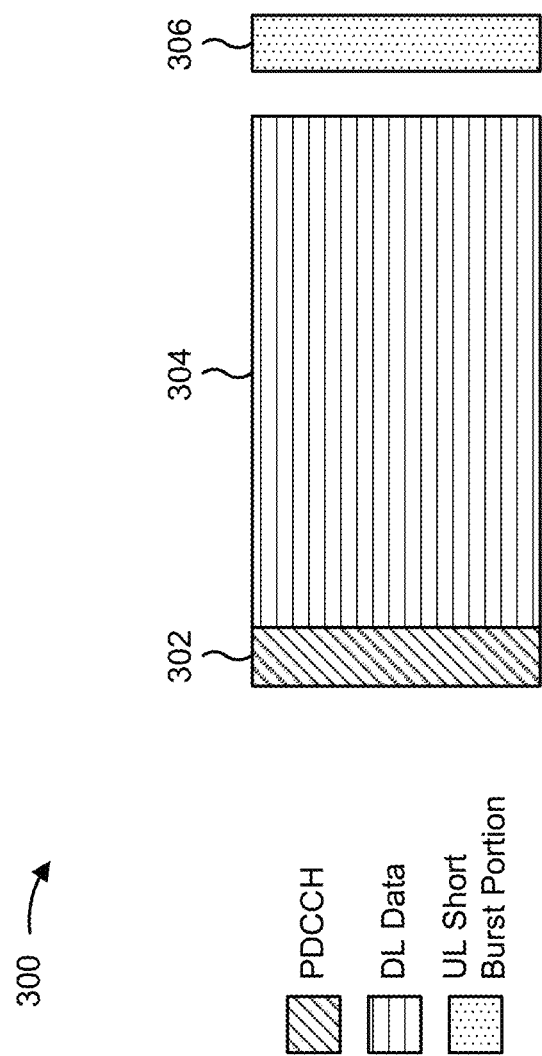

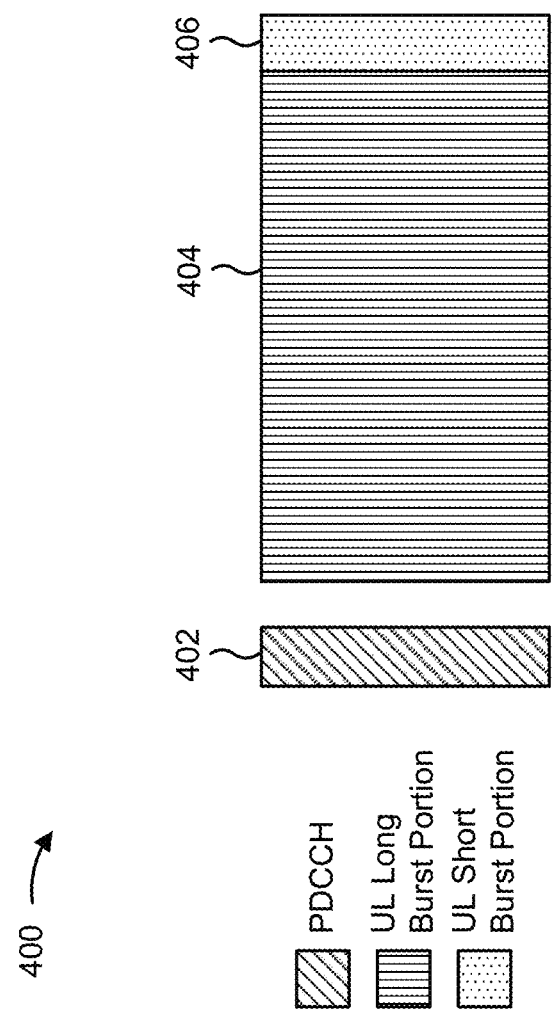

PHYSICAL DOWNLINK SHARED CHANNEL MAPPING TYPE FOR PHYSICAL DOWNLINK SHARED CHANNEL REPETITION IN ONE SLOT

CROSS-REFERENCE TO RELATED APPLICATION

This patent application claims priority to U.S. Provisional patent Application No. 62/962,666, filed on Jan. 17, 2020, entitled "PHYSICAL DOWNLINK SHARED CHANNEL MAPPING TYPE FOR PHYSICAL DOWNLINK SHARED CHANNEL REPETITION IN ONE SLOT," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for physical downlink shared channel (PDSCH) mapping type for PDSCH repetition in one slot.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a UE, may include receiving a downlink control information (DCI) communication that schedules a PDSCH including a first transmission occasion and a second transmission occasion; and determining a mapping type for the first transmission occasion and a mapping type for the second transmission occasion based at least in part on receiving the DCI communication scheduling the PDSCH including the first transmission occasion and the second transmission occasion.

In some aspects, a UE for wireless communication may include memory and one or more processors coupled to the memory. For example, the one or more processors may be operatively, electronically, communicatively, or otherwise coupled to the memory. The memory may comprise instructions executable by the one or more processors to cause the UE to: receive a DCI communication that schedules a PDSCH including a first transmission occasion and a second transmission occasion; and determine a mapping type for the first transmission occasion and a mapping type for the second transmission occasion based at least in part on receiving the DCI communication scheduling the PDSCH including the first transmission occasion and the second transmission occasion.

In some aspects, a non-transitory computer-readable medium may store one or more instructions for wireless communication. The one or more instructions, when executed by one or more processors of a UE, may cause the UE to: receive a DCI communication that schedules a PDSCH including a first transmission occasion and a second transmission occasion; and determine a mapping type for the first transmission occasion and a mapping type for the second transmission occasion based at least in part on receiving the DCI communication scheduling the PDSCH including the first transmission occasion and the second transmission occasion.

In some aspects, an apparatus for wireless communication may include means for receiving a DCI communication that schedules a PDSCH including a first transmission occasion and a second transmission occasion; and means for determining a mapping type for the first transmission occasion and a mapping type for the second transmission occasion based at least in part on receiving the DCI communication scheduling the PDSCH including the first transmission occasion and the second transmission occasion.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 3 is a diagram illustrating an example of a downlink (DL)-centric slot, in accordance with various aspects of the present disclosure.

FIG. 4 is a diagram illustrating an example of an uplink (UL)-centric slot, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
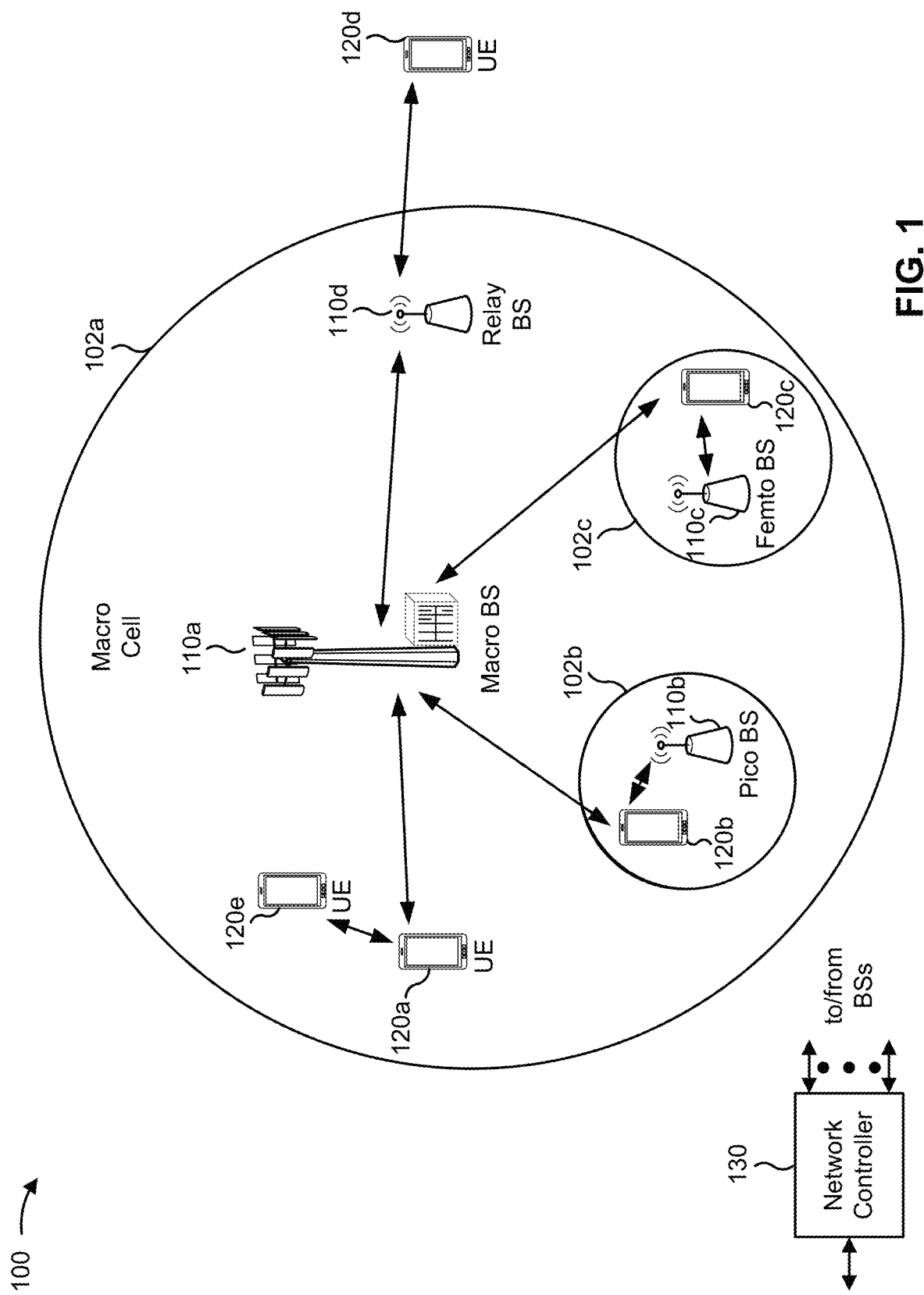
FIG. 1 is a block diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
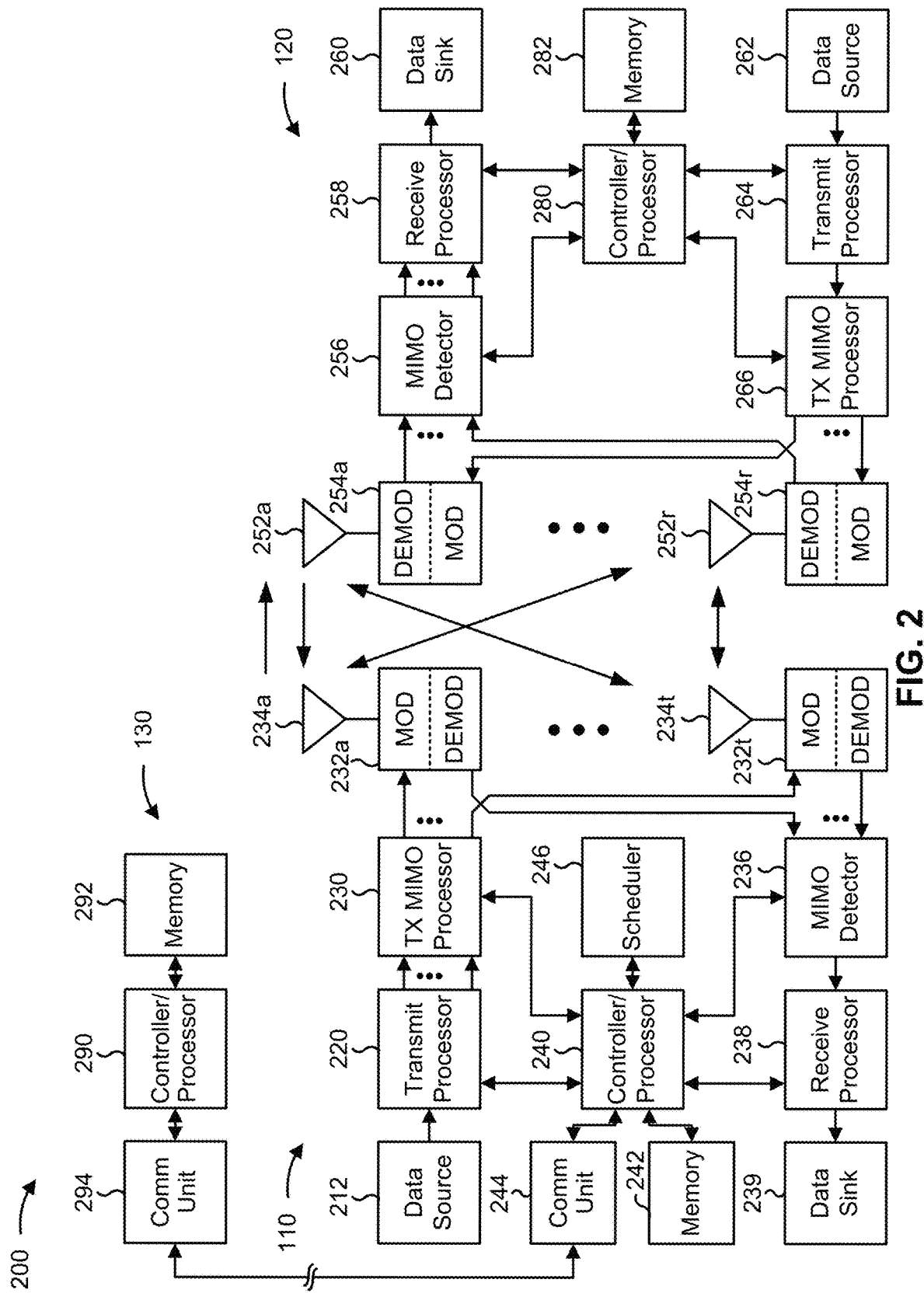
FIG. 2 is a block diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with PDSCH mapping type determination for PDSCH repetition in one slot, as described in more detail elsewhere herein. For example, controller/processor 240 of base station 110, controller/processor 280 of UE 120, and/or any other component(s) of FIG. 2 may perform or direct operations of, for example, process 600 of FIG. 6 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 600 of FIG. 6 and/or other processes as described herein. A scheduler 246 may schedule UEs for data transmission on the downlink and/or uplink.

In some aspects, UE 120 may include means for receiving a DCI communication that schedules a PDSCH including a first transmission occasion and a second transmission occasion; means for determining a mapping type for the first transmission occasion and a mapping type for the second transmission occasion based at least in part on receiving the DCI communication scheduling the PDSCH including the first transmission occasion and the second transmission occasion; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

FIG. 3 is a diagram 300 showing an example of a DL-centric slot or wireless communication structure. The DL-centric slot may include a control portion 302. The control portion 302 may exist in the initial or beginning portion of the DL-centric slot. The control portion 302 may include various scheduling information and/or control information corresponding to various portions of the DL-centric slot. In some configurations, the control portion 302 may be a physical DL control channel (PDCCH), as indicated in FIG. 3. In some aspects, the control portion 302 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, and/or the like), and/or the like.

The DL-centric slot may also include a DL data portion 304. The DL data portion 304 may sometimes be referred to as the payload of the DL-centric slot. The DL data portion 304 may include the communication resources utilized to communicate DL data from the scheduling entity (e.g., UE or BS) to the subordinate entity (e.g., UE). In some configurations, the DL data portion 304 may be a physical DL shared channel (PDSCH).

The DL-centric slot may also include an UL short burst portion 306. The UL short burst portion 306 may sometimes be referred to as an UL burst, an UL burst portion, a common UL burst, a short burst, an UL short burst, a common UL short burst, a common UL short burst portion, and/or various other suitable terms. In some aspects, the UL short burst portion 306 may include one or more reference signals. Additionally, or alternatively, the UL short burst portion 306 may include feedback information corresponding to various other portions of the DL-centric slot. For example, the UL short burst portion 306 may include feedback information corresponding to the control portion 302 and/or the data portion 304. Non-limiting examples of information that may be included in the UL short burst portion 306 include an ACK signal (e.g., a physical uplink control channel (PUCCH) acknowledgment (ACK), a physical uplink shared channel (PUSCH) ACK, an immediate ACK), a negative acknowledgment (NACK) signal (e.g., a PUCCH NACK, a PUSCH NACK, an immediate NACK), a scheduling request (SR), a buffer status report (BSR), a hybrid automatic repeat request (HARD) indicator, channel state information (CSI), a channel quality indicator (CQI), a sounding reference signal (SRS), a demodulation reference signal (DMRS), PUSCH data, and/or various other suitable types of information. The UL short burst portion 306 may include additional or alternative information, such as information pertaining to random access channel (RACH) procedures, scheduling requests, and various other suitable types of information.

As illustrated in FIG. 3, the end of the DL data portion 304 may be separated in time from the beginning of the UL short burst portion 306. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is one example of a DL-centric wireless communication structure, and alternative structures having similar features may exist without necessarily deviating from the aspects described herein.

As indicated above, FIG. 3 is provided as an example. Other examples may differ from what is described with regard to FIG. 3.

FIG. 4 is a diagram 400 showing an example of an UL-centric slot or wireless communication structure. The UL-centric slot may include a control portion 402. The control portion 402 may exist in the initial or beginning portion of the UL-centric slot. The control portion 402 in FIG. 4 may be similar to the control portion 302 described above with reference to FIG. 3. The UL-centric slot may also include an UL long burst portion 404. The UL long burst portion 404 may sometimes be referred to as the payload of the UL-centric slot. "UL portion" may refer to the communication resources utilized to communicate UL data from the subordinate entity (e.g., UE) to the scheduling entity (e.g., UE or BS). In some configurations, the control portion 402 may be a physical DL control channel (PDCCH).

As illustrated in FIG. 4, the end of the control portion 402 may be separated in time from the beginning of the UL long burst portion 404. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include an UL short burst portion 406. The UL short burst portion 406 in FIG. 4 may be similar to the UL short burst portion 306 described above with reference to FIG. 3, and may include any of the information described above in connection with FIG. 3. The foregoing is one example of an UL-centric wireless communication structure, and alternative structures having similar features may exist without necessarily deviating from the aspects described herein.

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

As indicated above, FIG. 4 is provided as an example. Other examples may differ from what is described with regard to FIG. 4.

In some wireless communications systems, a time domain resource allocation (TDRA), associated with scheduling a PDSCH, is indicated via DCI. In general, a TDRA field points to a TDRA table entry that identifies a mapping type associated with the PDSCH (e.g., mapping type A, mapping type B, and/or the like), a slot offset $K_0$ (e.g., a number of slots from the slot in which the DCI is received to the slot that the PDSCH is scheduled), a starting symbol S of the PDSCH, and an allocation length L of the PDSCH. The starting symbol S and the allocation length L can be a function of mapping type, and can be separately indicated or can be jointly indicated (e.g., using a start and length indicator value (SLIV)). The TDRA field may be between 0 and 4 bits in length (e.g., depending on a TDRA table to be used by the UE).

The mapping type indicates a manner in which the PDSCH is mapped in a slot carrying the PDSCH. For example, mapping type A indicates that a first DMRS symbol of the PDSCH is either on the third symbol of the slot (symbol 2) or the fourth symbol of the slot (symbol 3), and that the starting symbol of the PDSCH can be any of the first four symbols of the slot (symbol 0, symbol 1, symbol 2, or symbol 3). For mapping type A, a bit in a master information block (MIB) indicates whether the first DMRS symbol of the PDSCH is the third symbol or the fourth symbol, and the starting symbol of the PDSCH is indicated by the TDRA, as described above. As another example, mapping type B indicates that a first DMRS symbol of the PDSCH is the first symbol of the PDSCH, and that the starting symbol of the PDSCH can be any symbol of the slot other than the last symbol of the slot. For mapping type B, the starting symbol of the PDSCH is indicated by the TDRA, as described above.

Additionally, in some cases, a UE may be configured to implement a scheme associated with time-division multiplexing of multiple PDSCH transmission occasions within a single slot. According to such a scheme, a single DCI is used to schedule a PDSCH including a first transmission occasion and a second transmission occasion in a single slot (e.g., such that a PDSCH transmission and at least one repetition of the PDSCH transmission take place in the same slot). Here, the first and second transmission occasions are associated with different transmission configuration indicator (TCI) states within the single slot, and use non-overlapping time resource allocations. Use of such a scheme may be advantageous in, for example, a multi-transmission reception point (multi-TRP) scenario for supporting high reliability and/or low latency communications (e.g., ultra-reliable low-latency communications (URLLC)), such as the so-called "Scheme 3" (also referred to as TDMSchemeA).

According to the scheme associated with time-division multiplexing of multiple PDSCH transmission occasions within a single slot, a single DCI communication can be used when scheduling a PDSCH including a first transmission occasion and a second transmission occasion. For example, a TCI field of the DCI communication may indicate two TCI states. Here, the UE may determine that the TCI field indicates two TCI states, and may therefore determine that the PDSCH scheduled by the DCI communication includes a first transmission occasion and a second transmission occasion. In some cases, a starting symbol of the second transmission occasion has symbol offset K relative to a last symbol of the first transmission occasion. The value of K can be configured by, for example, radio resource control (RRC) signalling or, if not configured, is set to a value of 0. A starting symbol of the first transmission occasion and a length of the first transmission occasion are indicated by the TDRA field (e.g., in a manner described above, such as using a SLIV), and a length of the second transmission occasion is assumed to be the same as that of the first transmission occasion.

As noted above, when implementing a scheme associated with time-division multiplexing of multiple PDSCH transmission occasions within a single slot (e.g., TDMSchemeA), a TDRA field of a DCI communication may indicate a row of a TDRA table, where the row of the TDRA table indicates a value for slot offset $K_0$, a starting symbol S of the PDSCH and an allocation length L of the PDSCH symbol (e.g., separately, or jointly using a SLIV), and a mapping type (e.g., mapping type A, mapping type B, and/or the like). Here, the UE may be configured to apply the starting symbol S, as indicated by the TDRA field, to the first transmission occasion, and to apply the allocation length L to both the first and second transmission occasions. However, a manner in which the UE interprets the mapping type indicated by the TDRA field should be configured in order to enable the UE to determine locations of DMRS symbols for the first and second transmission occasions within the slot, which enables the UE to attempt to receive the first and second transmission occasions in the slot.

Some aspects described herein provide techniques and apparatuses associated with determining a PDSCH mapping type for PDSCH repetition in one slot. In some aspects, a UE may receive a DCI communication that schedules a PDSCH including a first transmission occasion and a second transmission occasion, and may determine a mapping type for the first transmission occasion and a mapping type for the second transmission occasion based at least in part on receiving the DCI communication. Additional details are described below.

FIGS. 5A-5D are diagrams illustrating examples associated with PDSCH mapping type determination for PDSCH repetition in one slot, in accordance with various aspects of the present disclosure. In the examples illustrated by FIGS. 5A-5D, a UE (e.g., UE 120) is configured to implement a scheme associated with time-division multiplexing of multiple transmission occasions within a single slot. For example, the UE may be configured to implement TDMSchemeA (e.g., based at least in part on an RRC parameter RepSchemeEnabler being set to "TDM-SchemeA").

Figure 5A:
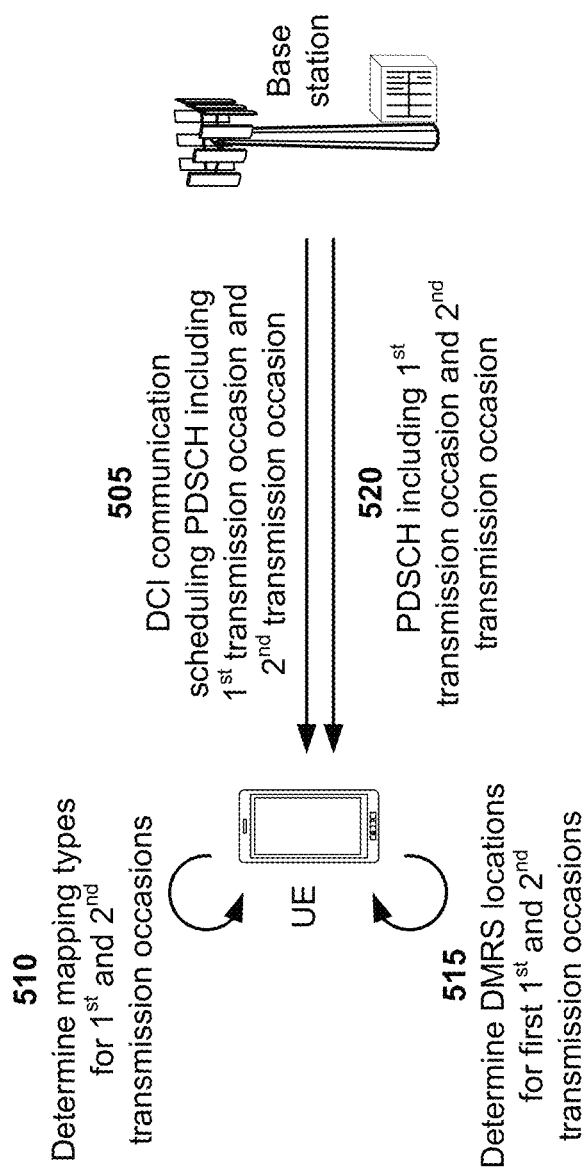
FIGS. 5A-5D are diagrams illustrating examples associated with PDSCH mapping type determination for PDSCH repetition in one slot, in accordance with various aspects of the present disclosure.

As shown in FIG. 5A by reference 505, the UE may receive a DCI communication that schedules a PDSCH including a first transmission occasion and a second transmission occasion. For example, the UE may receive a DCI communication in which a TCI field indicates two TCI states (e.g., a first TCI state and a second TCI state). Here, the UE may determine that the DCI communication schedules the PDSCH including the first transmission occasion and the second transmission occasion based at least in part on the TCI field indicating two TCI states. That is, the TCI field indicating two TCI states may serve as an indication that the scheduled PDSCH includes a first transmission occasion and second transmission occasion.

As shown by reference 510, the UE may determine a mapping type for the first transmission occasion and a mapping type for the second transmission occasion based at least in part on receiving the DCI communication. For example, the UE may determine a mapping type for the first transmission occasion and a mapping type for the second transmission occasion based at least in part on determining that the DCI communication schedules the PDSCH including the first transmission occasion and the second transmission occasion.

In some aspects, the UE may determine the mapping type for the first transmission occasion based at least in part on a mapping type indicated by the DCI communication, and may determine the mapping type for the second transmission occasion based at least in part on an assumed mapping type. In such a case, in some aspects, the mapping type indicated by the DCI communication may be mapping type A or mapping type B, and the assumed mapping type may be mapping type B. Notably, the assumed mapping type may be mapping type B in this case because the mapping type for the first transmission occasion and the mapping type for the second transmission occasion cannot both be mapping type A (e.g., since the location of the first DMRS symbols of the first and second transmission occasions would be required to be in adjacent symbols in such a case).

Alternatively, in some aspects, the UE may determine the mapping type for the first transmission occasion and the mapping type for the second transmission occasion based at least in part on an assumed mapping type. In such a case, in some aspects, the assumed mapping type may be mapping type B (e.g., since the mapping type for the first transmission occasion and the mapping type for the second transmission occasion cannot both be mapping type A). In some aspects, if a mapping type indicated by the DCI communication is different from the assumed mapping type (e.g., if the mapping type indicated by the TDRA field is mapping type A), the UE may identify an error associated with the DCI communication (since the UE does not expect this case) and/or refrain from receiving or processing the PDSCH (e.g., the UE may ignore the DCI communication). Alternatively, in some aspects, when a mapping type indicated by the DCI communication is different from the assumed mapping type, the UE may receive the PDSCH based at least in part on the assumed mapping type rather than the mapping type indicated by the DCI communication (e.g., the UE may ignore the indicated mapping type and receive the PDSCH for both the first and second transmission occasions based on mapping type B).

Alternatively, in some aspects, the UE may determine the mapping type for the second transmission occasion based at least in part on a mapping type indicated by the DCI communication, and may determine the mapping type for the first transmission occasion based at least in part on the assumed mapping type. In such a case, in some aspects, the mapping type indicated by the DCI communication may be mapping type A or mapping type B, and the assumed mapping type may be mapping type B. As noted above, the assumed mapping type is mapping type B in this case because the mapping type for the first transmission occasion and the mapping type for the second transmission occasion cannot both be mapping type A.

Alternatively, in some aspects, the UE may determine the mapping type for the first transmission occasion based at least in part on a first mapping type indicated by the DCI communication, and may determine the mapping type for the second transmission occasion based at least in part on a second mapping type indicated by the DCI communication. In such a case, the first mapping type indicated by the DCI communication may be mapping type A and the second mapping type indicated by the DCI communication may be mapping type B. Alternatively, the first mapping type indicated by the DCI communication may be mapping type B and the second mapping type indicated by the DCI communication may be mapping type A or mapping type B. Notably, in this example, the TDRA table may be configured so that each row indicates two mapping types. Thus, the row of the TDRA table indicated by the TDRA field of the DCI communication can indicate two mapping types to be applied to the two transmission occasions.

In some aspects, the UE may identify a technique for determining the mapping type for the first transmission occasion and the mapping type for the second transmission occasion. That is, in some aspects, the UE may identify one of the above-described techniques to be used for determining the mapping types of the first and second transmission occasions. In some aspects, the UE may identify the technique, and may determine the mapping type for the first transmission occasion and the mapping type for the second transmission occasion based at least in part on the technique.

In some aspects, the UE may identify the technique for determining the mapping type for the first transmission occasion and the mapping type for the second transmission occasion based at least in part on a configuration received by the UE. For example, the UE may receive, via RRC signaling, a configuration indicating the technique to be used for determining the mapping types for the first and second transmission occasions, and may identify the technique based at least in part on the configuration.

Alternatively, the UE may identify the technique for determining the mapping type for the first transmission occasion and the mapping type for the second transmission occasion based at least in part on a set of parameters. The set of parameters may include, for example, the symbol offset K (e.g., the symbol offset between the first transmission occasion and the second transmission occasion), a configured location of a DMRS of the PDSCH (e.g., a DMRS-TypeA-Position, which is a configured location of the DMRS of the PDSCH associated with mapping type A), the starting symbol S (the starting symbol of the PDSCH), the allocation length L (a length of the first and second transmission occasions), and/or the like. Here, the mapping type for the first transmission occasion and the mapping type for the second transmission occasion may be a function of the one or more parameters, and the UE may determine the mapping types for the first and second transmission occasions based at least in part on applying the function to the one or more parameters.

As shown by reference 515, the UE may determine a location of a DMRS for the first transmission occasion and a location of a DMRS for the second transmission occasion based at least in part on the mapping type for the first transmission occasion and the mapping type for the second transmission occasion. For example, based at least in part on the mapping type for the first transmission occasion and the mapping type for the second transmission occasion, the UE may identify a symbol of the slot that is to carry a DMRS for the first transmission occasion, and may identify a symbol of the slot that is to carry a DMRS for the second transmission occasion.

As shown by reference 520, the UE may receive the PDSCH including the first transmission occasion and the second transmission occasion. For example, based at least in part on determining the location of the DMRS for the first transmission occasion and the location of the DMRS for the second transmission occasion, the UE may attempt to receive the first transmission occasion and the second transmission occasion within the slot.

Figure 5B:
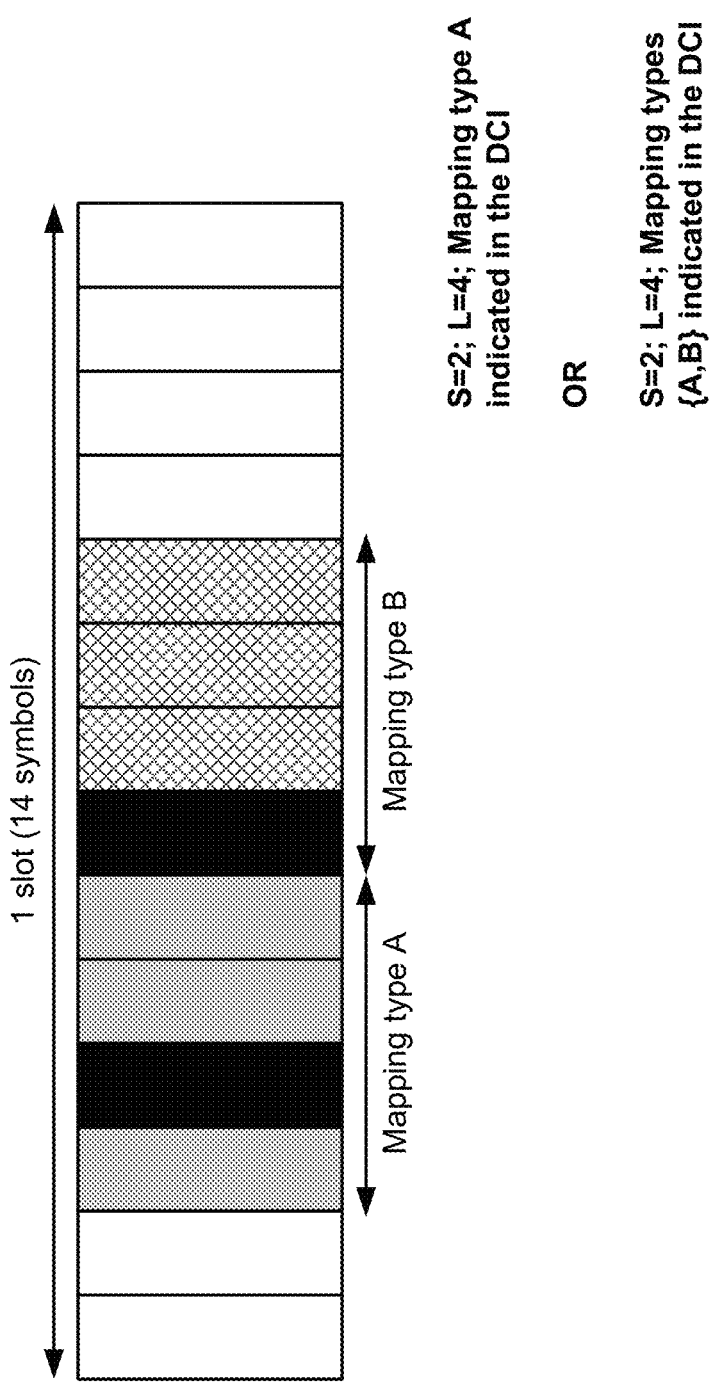
Figure 5C:
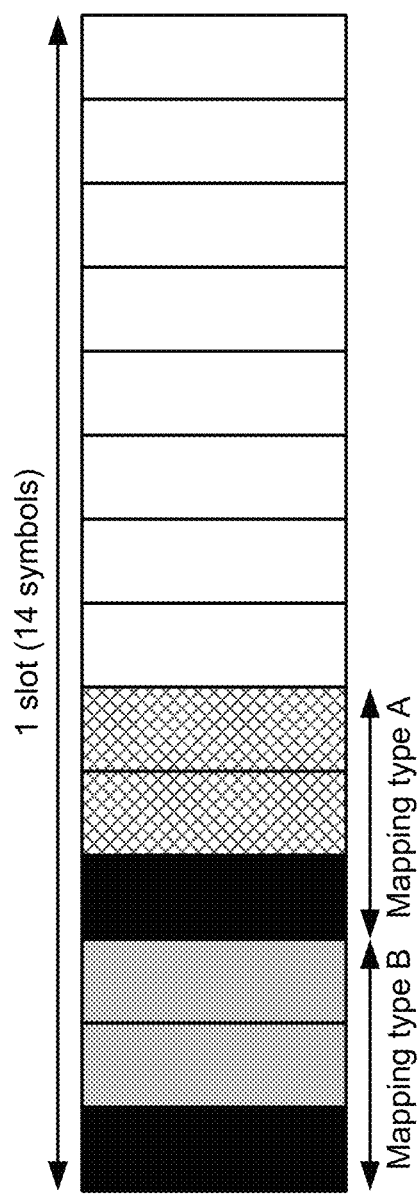
Figure 5D:
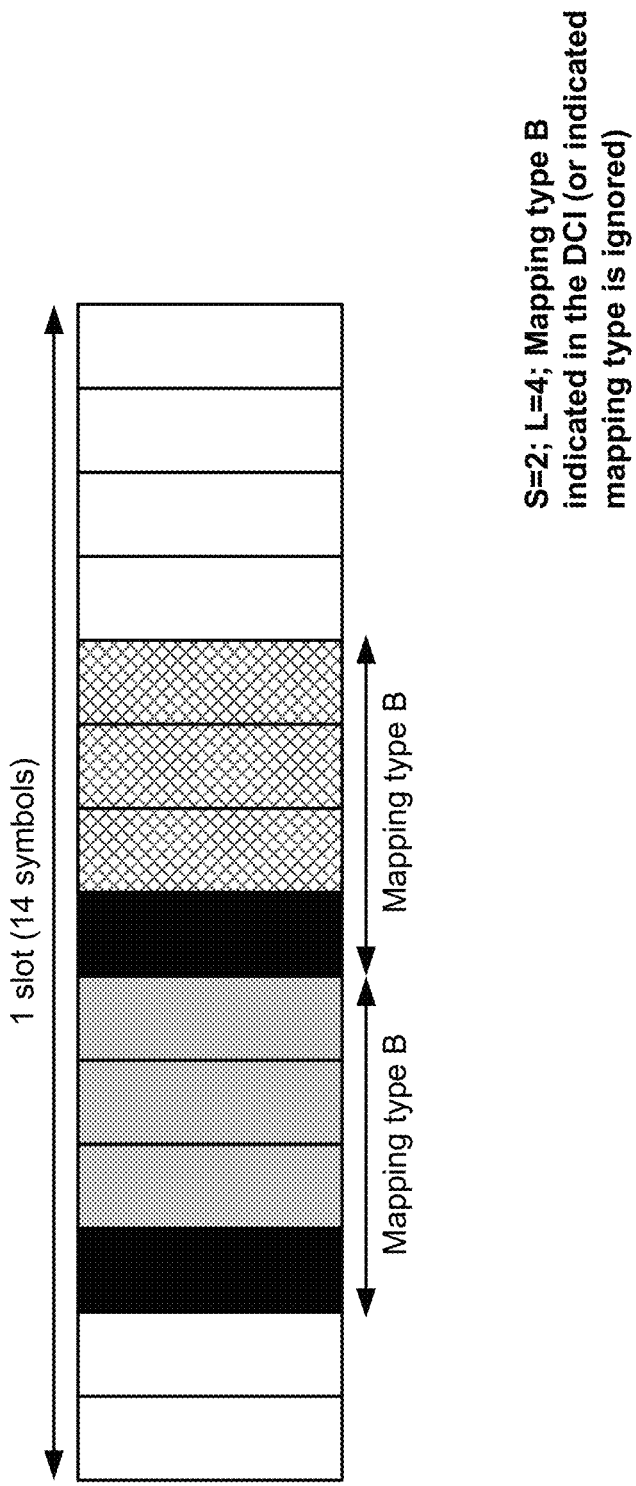

FIGS. 5B-5D are diagrams illustrating various examples of slots carrying PDSCH including a first transmission occasion and a second transmission occasion. In FIGS. 5B-5D, the symbol offset K is 0, the location of the DMRS for mapping type A is configured as the fourth symbol (symbol 3), two transmission occasions are scheduled, and black boxes show locations of symbols carrying DMRS. Further, gray boxes show locations of symbols of the first transmission occasion, and cross-hatched boxes show locations of symbols of the second transmission occasion. White boxes show locations of the remaining symbols of the slot (e.g., not used for carrying DMRS or PDSCH).

In the example slot shown in FIG. 5B, a TDRA field of a DCI communication scheduling the PDSCH including the first and second transmission occasions indicates the starting symbol S as a third symbol (S=2) and the allocation length L as four symbols (L=4). As noted in FIG. 5B, the TDRA field may, in one example, indicate mapping type A, which the UE applies to the first transmission occasion. Such an indication may be used when, for example, the UE is to determine the mapping type for the first transmission occasion based at least in part on the mapping type indicated by the DCI communication, and is to determine the mapping type for the second transmission occasion based at least in part on an assumed mapping type. In this example, the UE determines the mapping type for the first transmission occasion as mapping type A (as indicated by the TDRA field), and determines the mapping type for the second transmission occasion as mapping type B (based on the assumed mapping type being mapping type B).

As further noted in FIG. 5B, the TDRA field may, in another example, indicate mapping type A and mapping type B ({A, B}). Such an indication may be used when, for example, the UE is to determine the mapping type for the first transmission occasion based at least in part on a first mapping type indicated by the DCI communication, and determine the mapping type for the second transmission occasion based at least in part on a second mapping type indicated by the DCI communication. In this example, the UE determines the mapping type for the first transmission occasion as mapping type A (as indicated by the TDRA field), and determines the mapping type for the second transmission occasion as mapping type B (as indicated by the TDRA field).

In the example slot shown in FIG. 5C, a TDRA field of a DCI communication scheduling the PDSCH including the first and second transmission occasions indicates the starting symbol S as a first symbol (S=0) and the allocation length L as three symbols (L=3). As noted in FIG. 5C, the TDRA field may, in this example, indicate mapping type A, which the UE applies to the second transmission occasion. Such an indication may be used when, for example, the UE is to determine the mapping type for the second transmission occasion based at least in part on the mapping type indicated by the DCI communication, and is to determine the mapping type for the first transmission occasion based at least in part on an assumed mapping type. In this example, the UE determines the mapping type for the second transmission occasion as mapping type A (as indicated by the TDRA field), and determines the mapping type for the first transmission occasion as mapping type B (based on the assumed mapping type being mapping type B).

In the example slot shown in FIG. 5D, a TDRA field of a DCI communication scheduling the PDSCH including the first and second transmission occasions indicates the starting symbol S as a first symbol (S=2) and the allocation length L as four symbols (L=4). As noted in FIG. 5D, the TDRA field may, in one example, indicate mapping type B. Such an indication may be used when, for example, the UE is to determine the mapping type for the first transmission occasion and the mapping type for the second transmission occasion based at least in part on an assumed mapping type of mapping type B (e.g., when the mapping type indicated by the TDRA field should match the assumed mapping type, or when the mapping type indicated by the TDRA field is to be ignored).

The example slot shown in FIG. 5D can also be indicated when, for example, the UE is to determine the mapping type for the first transmission occasion based at least in part on the mapping type indicated by the DCI communication, and is to determine the mapping type for the second transmission occasion based at least in part on an assumed mapping type. In this example, the UE determines the mapping type for the first transmission occasion as mapping type B (as indicated by the TDRA field), and determines the mapping type for the second transmission occasion as mapping type B (based on the assumed mapping type being mapping type B).

Similarly, the example slot shown in FIG. 5D can also be indicated when, for example, the UE is to determine the mapping type for the second transmission occasion based at least in part on the mapping type indicated by the DCI communication, and is to determine the mapping type for the first transmission occasion based at least in part on an assumed mapping type. In this example, the UE determines the mapping type for the second transmission occasion as mapping type B (as indicated by the TDRA field), and determines the mapping type for the first transmission occasion as mapping type B (based on the assumed mapping type being mapping type B).

As indicated above, FIGS. 5A-5D are provided as examples. Other examples may differ from what is described with respect to FIGS. 5A-5D.

Figure 6:
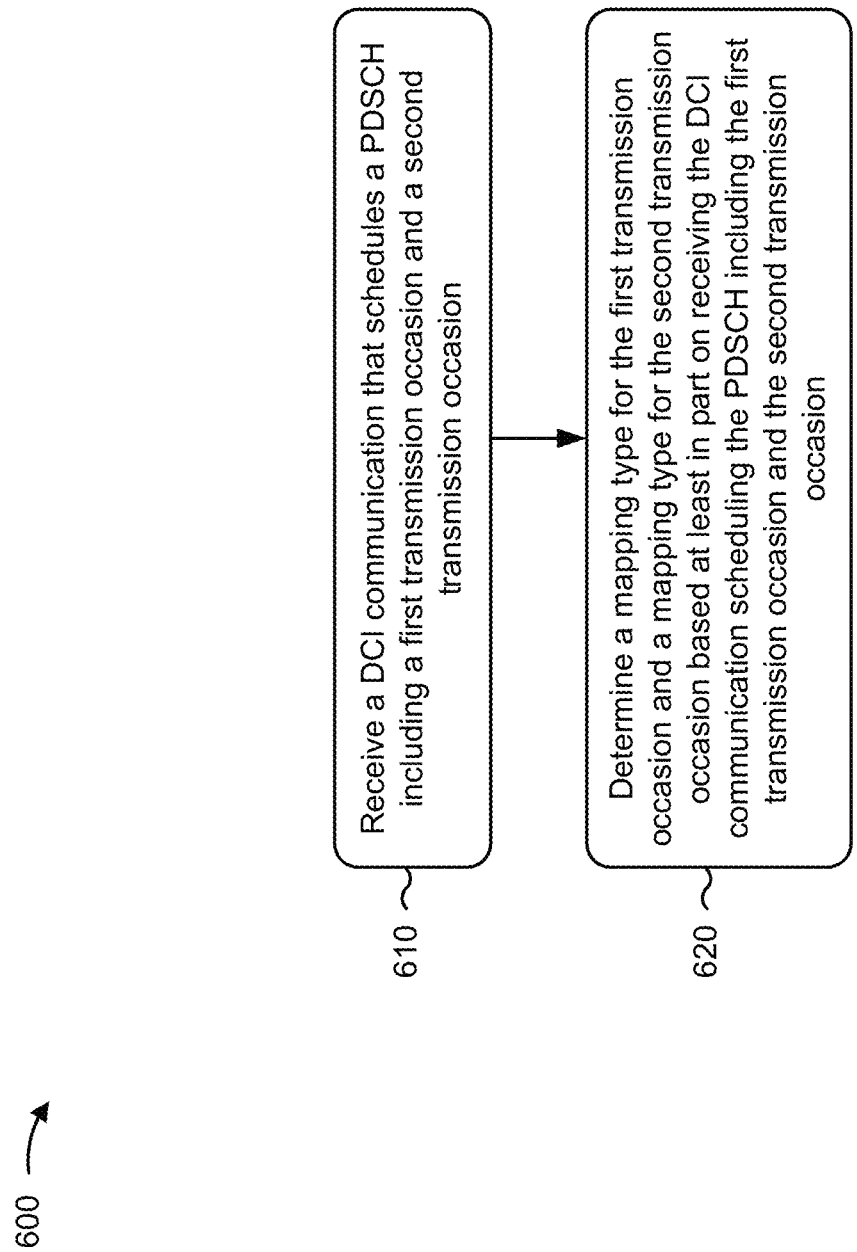
FIG. 6 is a diagram illustrating an example process performed, for example, by a user equipment, in accordance with various aspects of the present disclosure.

FIG. 6 is a diagram illustrating an example process 600 performed, for example, by a UE, in accordance with various aspects of the present disclosure. Example process 600 is an example where the UE (e.g., UE 120 and/or the like) performs operations associated with PDSCH mapping type determination for PDSCH repetition in one slot.

As shown in FIG. 6, in some aspects, process 600 may include receiving a DCI communication that schedules a PDSCH including a first transmission occasion and a second transmission occasion (block 610). For example, the UE (e.g., using receive processor 258, controller/processor 280, memory 282, and/or the like) may receive a DCI communication that schedules a PDSCH including a first transmission occasion and a second transmission occasion, as described above.

As further shown in FIG. 6, in some aspects, process 600 may include determining a mapping type for the first transmission occasion and a mapping type for the second transmission occasion based at least in part on receiving the DCI communication scheduling the PDSCH including the first transmission occasion and the second transmission occasion (block 620). For example, the UE (e.g., using receive processor 258, controller/processor 280, memory 282, and/or the like) may determine a mapping type for the first transmission occasion and a mapping type for the second transmission occasion based at least in part on receiving the DCI communication scheduling the PDSCH including the first transmission occasion and the second transmission occasion, as described above.

Process 600 may include additional aspects, such as any single aspect or any combination of aspects described below and/or in connection with one or more other processes described elsewhere herein.

In a first aspect, process 600 includes determining a location of a DMRS for the first transmission occasion and a location of a DMRS for the second transmission occasion based at least in part on the mapping type for the first transmission occasion and the mapping type for the second transmission occasion.

In a second aspect, alone or in combination with the first aspect, the UE is configured to implement a scheme associated with time-division multiplexing of multiple transmission occasions within a single slot.

In a third aspect, alone or in combination with one or more of the first and second aspects, process 600 includes determining that the DCI communication schedules the PDSCH including the first transmission occasion and the second transmission occasion based at least in part on a TCI field of the DCI communication indicating a first TCI state and a second TCI state.

In a fourth aspect, alone or in combination with one or more of the first through third aspects, determining the mapping type for the first transmission occasion and the mapping type for the second transmission occasion comprises determining the mapping type for the first transmission occasion based at least in part on a mapping type indicated by the DCI communication; and determining the mapping type for the second transmission occasion based at least in part on an assumed mapping type.

In a fifth aspect, alone or in combination with one or more of the first through fourth aspects, the mapping type indicated by the DCI communication comprises mapping type A or mapping type B, and the assumed mapping type comprises mapping type B.

In a sixth aspect, alone or in combination with one or more of the first through fifth aspects, determining the mapping type for the first transmission occasion and the mapping type for the second transmission occasion comprises determining the mapping type for the first transmission occasion and the mapping type for the second transmission occasion based at least in part on an assumed mapping type.

In a seventh aspect, alone or in combination with one or more of the first through sixth aspects, the assumed mapping type comprises mapping type B.

In an eighth aspect, alone or in combination with one or more of the first through seventh aspects, when a mapping type indicated by the DCI communication is different from the assumed mapping type, process 600 includes at least one of identifying an error associated with the DCI communication, or refraining from receiving or processing the PDSCH.

In a ninth aspect, alone or in combination with one or more of the first through eighth aspects, when a mapping type indicated by the DCI communication is different from the assumed mapping type, process 600 includes receiving the PDSCH based at least in part on the assumed mapping type rather than the mapping type indicated by the DCI communication.

In a tenth aspect, alone or in combination with one or more of the first through ninth aspects, determining the mapping type for the first transmission occasion and the mapping type for the second transmission occasion comprises determining the mapping type for the second transmission occasion based at least in part on a mapping type indicated by the DCI communication, and determining the mapping type for the first transmission occasion based at least in part on an assumed mapping type.

In an eleventh aspect, alone or in combination with one or more of the first through tenth aspects, the mapping type indicated by the DCI communication comprises mapping type A or mapping type B, and the assumed mapping type comprises mapping type B.

In a twelfth aspect, alone or in combination with one or more of the first through eleventh aspects, determining the mapping type for the first transmission occasion and the mapping type for the second transmission occasion comprises determining the mapping type for the first transmission occasion based at least in part on a first mapping type indicated by the DCI communication, and determining the mapping type for the second transmission occasion based at least in part on a second mapping type indicated by the DCI communication.

In a thirteenth aspect, alone or in combination with one or more of the first through twelfth aspects, the first mapping type indicated by the DCI communication comprises mapping type A and the second mapping type indicated by the DCI communication comprises mapping type B.

In a fourteenth aspect, alone or in combination with one or more of the first through thirteenth aspects, the first mapping type indicated by the DCI communication comprises mapping type B and the second mapping type indicated by the DCI communication comprises mapping type A or mapping type B.

In a fifteenth aspect, alone or in combination with one or more of the first through fourteenth aspects, process 600 includes identifying a technique for determining the mapping type for the first transmission occasion and the mapping type for the second transmission occasion; and determining the mapping type for the first transmission occasion and the mapping type for the second transmission occasion based at least in part on the technique.

In a sixteenth aspect, alone or in combination with one or more of the first through fifteenth aspects, the technique for determining the mapping type for the first transmission occasion and the mapping type for the second transmission occasion is identified based at least in part on a configuration received via radio resource control signaling.

In a seventeenth aspect, alone or in combination with one or more of the first through sixteenth aspects, the technique for determining the mapping type for the first transmission occasion and the mapping type for the second transmission occasion is identified based at least in part on a set of parameters including at least one of a symbol offset between the first transmission occasion and the second transmission occasion, a configured location of a DMRS of the PDSCH, a starting symbol of the PDSCH, or a length of a transmission occasion.

In an eighteenth aspect, alone or in combination with one or more of the first through seventeenth aspects, the configured location of the DMRS of the PDSCH is associated with mapping type A.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The following provides an overview of some aspects of the present disclosure:

Aspect 1: A method of wireless communication performed by a user equipment (UE), comprising: receiving a downlink control information (DCI) communication that schedules a physical downlink shared channel (PDSCH) including a first transmission occasion and a second transmission occasion; and determining a mapping type for the first transmission occasion and a mapping type for the second transmission occasion based at least in part on receiving the DCI communication scheduling the PDSCH including the first transmission occasion and the second transmission occasion.

Aspect 2: The method of aspect 1, wherein the determining the mapping type for the first transmission occasion and the mapping type for the second transmission occasion comprises: determining the mapping type for the first transmission occasion and the mapping type for the second transmission occasion based at least in part on an assumed mapping type.

Aspect 3: The method of aspect 2, wherein the assumed mapping type comprises mapping type B.

Aspect 4: The method of any of aspects 2-3, wherein, when a mapping type indicated by the DCI communication is different from the assumed mapping type, the method comprises at least one of: identifying an error associated with the DCI communication, or refraining from receiving or processing the PDSCH.

Aspect 5: The method of any of aspects 2-4, wherein, when a mapping type indicated by the DCI communication is different from the assumed mapping type, the method comprises: receiving the PDSCH based at least in part on the assumed mapping type rather than the mapping type indicated by the DCI communication.

Aspect 6: The method of any of aspects 1-5, further comprising: determining a location of a demodulation reference signal (DMRS) for the first transmission occasion and a location of a DMRS for the second transmission occasion based at least in part on the mapping type for the first transmission occasion and the mapping type for the second transmission occasion.

Aspect 7: The method of any of aspects 1-6, wherein the UE is configured to implement a scheme associated with time-division multiplexing of multiple transmission occasions within a single slot.

Aspect 8: The method of any of aspects 1-7, further comprising: determining that the DCI communication schedules the PDSCH including the first transmission occasion and the second transmission occasion based at least in part on a transmission configuration indicator (TCI) field of the DCI communication indicating a first TCI state and a second TCI state.

Aspect 9: The method of any of aspects 1-8, wherein the determining the mapping type for the first transmission occasion and the mapping type for the second transmission occasion comprises: determining the mapping type for the first transmission occasion based at least in part on a mapping type indicated by the DCI communication; and determining the mapping type for the second transmission occasion based at least in part on an assumed mapping type.

Aspect 10: The method of aspect 9, wherein the mapping type indicated by the DCI communication comprises mapping type A or mapping type B, and the assumed mapping type comprises mapping type B.

Aspect 11: The method of any of aspects 1-10, wherein the determining the mapping type for the first transmission occasion and the mapping type for the second transmission occasion comprises: determining the mapping type for the second transmission occasion based at least in part on a mapping type indicated by the DCI communication; and determining the mapping type for the first transmission occasion based at least in part on an assumed mapping type.

Aspect 12: The method of aspect 11, wherein the mapping type indicated by the DCI communication comprises mapping type A or mapping type B, and the assumed mapping type comprises mapping type B.

Aspect 13: The method of any of aspects 1-12, wherein the determining the mapping type for the first transmission occasion and the mapping type for the second transmission occasion comprises: determining the mapping type for the first transmission occasion based at least in part on a first mapping type indicated by the DCI communication; and determining the mapping type for the second transmission occasion based at least in part on a second mapping type indicated by the DCI communication.

Aspect 14: The method of aspect 13, wherein the first mapping type indicated by the DCI communication comprises mapping type A and the second mapping type indicated by the DCI communication comprises mapping type B.

Aspect 15: The method of any of aspects 13-14, wherein the first mapping type indicated by the DCI communication comprises mapping type B and the second mapping type indicated by the DCI communication comprises mapping type A or mapping type B.

Aspect 16: The method of any of aspects 1-15, further comprising: identifying a technique for determining the mapping type for the first transmission occasion and the mapping type for the second transmission occasion; and determining the mapping type for the first transmission occasion and the mapping type for the second transmission occasion based at least in part on the technique.

Aspect 17: The method of aspect 16, wherein the technique for determining the mapping type for the first transmission occasion and the mapping type for the second transmission occasion is identified based at least in part on a configuration received via radio resource control signaling.

Aspect 18: The method of any of aspects 16-17, wherein the technique for determining the mapping type for the first transmission occasion and the mapping type for the second transmission occasion is identified based at least in part on a set of parameters including at least one of: a symbol offset between the first transmission occasion and the second transmission occasion, a configured location of a demodulation reference signal (DMRS) of the PDSCH, a starting symbol of the PDSCH, or a length of a transmission occasion.

Aspect 19: The method of aspect 18, wherein the configured location of the DMRS of the PDSCH is associated with mapping type A.

Aspect 20: An apparatus for wireless communication at a device, comprising a processor; memory coupled with the processor; and instructions stored in the memory and executable by the processor to cause the apparatus to perform the method of one or more aspects of aspects 1-19.

Aspect 21: A device for wireless communication, comprising a memory and one or more processors coupled to the memory, the memory and the one or more processors configured to perform the method of one or more aspects of aspects 1-19.

Aspect 22: An apparatus for wireless communication, comprising at least one means for performing the method of one or more aspects of aspects 1-19.

Aspect 23: A non-transitory computer-readable medium storing code for wireless communication, the code comprising instructions executable by a processor to perform the method of one or more aspects of aspects 1-19.

Aspect 24: A non-transitory computer-readable medium storing a set of instructions for wireless communication, the set of instructions comprising one or more instructions that, when executed by one or more processors of a device, cause the device to perform the method of one or more aspects of aspects 1-19.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware and/or a combination of hardware and software. Software shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, software, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A, X employs B, or X employs both A and B. The term "and/or," when used in a list of two or more items, means that any one of the listed items can be employed by itself, or any combination of two or more of the listed items can be employed. For example, if a composition is described as containing components A, B, and/or C, the composition can contain A alone, B alone, C alone, A and B in combination, A and C in combination, B and C in combination, or A, B, and C in combination. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, c-c-c, or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    receiving a downlink control information (DCI) communication that schedules a physical downlink shared channel (PDSCH) including a first transmission occasion and a second transmission occasion and that indicates a PDSCH mapping type used to identify a symbol that is to carry a demodulation reference signal (DMRS), the PDSCH mapping type being for the first transmission occasion and the second transmission occasion; and
    receiving the PDSCH based at least in part on the PDSCH mapping type.

2. The method of claim 1, further comprising:
    determining the PDSCH mapping type for the first transmission occasion and the second transmission occasion based at least in part on an assumed mapping type.

3. The method of claim 2, wherein the assumed mapping type comprises a mapping type B.

4. The method of claim 2, wherein, when the PDSCH mapping type is different from the assumed mapping type, the method comprises:
    identifying an error associated with the DCI communication.

5. The method of claim 1, further comprising:
    determining a location of a DMRS for the first transmission occasion and a location of a DMRS for the second transmission occasion based at least in part on the PDSCH mapping type.

6. The method of claim 1, wherein the UE is configured to implement a scheme associated with time-division multiplexing of multiple transmission occasions within a single slot.

7. The method of claim 1, further comprising:
    determining that the DCI communication schedules the PDSCH including the first transmission occasion and the second transmission occasion based at least in part on a transmission configuration indicator (TCI) field of the DCI communication indicating a first TCI state and a second TCI state.

8. The method of claim 1, further comprising:
    determining the PDSCH mapping type for the first transmission occasion and the second transmission occasion based at least in part on an assumed mapping type matching the PDSCH mapping type.

9. The method of claim 8, wherein the PDSCH mapping type comprises a mapping type B, and the assumed mapping type comprises the mapping type B.

10. The method of claim 1, further comprising:
    identifying a technique for determining the PDSCH mapping type for the first transmission occasion and the second transmission occasion; and
    determining the PDSCH mapping type for the first transmission occasion and the second transmission occasion based at least in part on the technique.

11. The method of claim 10, wherein the technique is identified based at least in part on a configuration received via radio resource control signaling.

12. The method of claim 10, wherein the technique is identified based at least in part on a set of parameters including at least one of:
    a symbol offset between the first transmission occasion and the second transmission occasion,
    a configured location of a DMRS of the PDSCH,
    a starting symbol of the PDSCH, or
    a length of a transmission occasion.

13. The method of claim 12, wherein the configured location of the DMRS of the PDSCH is associated with a mapping type A.

14. A user equipment (UE) for wireless communication, comprising:
    a memory; and
    one or more processors coupled to the memory, the memory comprising instructions for the one or more processors to cause the UE to:
        receive a downlink control information (DCI) communication that schedules a physical downlink shared channel (PDSCH) including a first transmission occasion and a second transmission occasion and that indicates a PDSCH mapping type used to identify a symbol that is to carry a demodulation reference signal (DMRS), the PDSCH mapping type being for the first transmission occasion and the second transmission occasion; and
        receive the PDSCH based at least in part on the PDSCH mapping type.

15. The UE of claim 14, wherein the instructions are further for the one or more processors to cause the UE to:
    determine the PDSCH mapping type for the first transmission occasion and the second transmission occasion based at least in part on an assumed mapping type.

16. The UE of claim 15, wherein the assumed mapping type comprises a mapping type B.

17. The UE of claim 15, wherein the instructions, when the PDSCH mapping type is different from the assumed mapping type, are further for the one or more processors to cause the UE to:
    identify an error associated with the DCI communication.

18. The UE of claim 14, wherein the UE is configured to implement a scheme associated with time-division multiplexing of multiple transmission occasions within a single slot.

19. The UE of claim 14, wherein the instructions are further for the one or more processors to cause the UE to:
    determine that the DCI communication schedules the PDSCH including the first transmission occasion and the second transmission occasion based at least in part on a transmission configuration indicator (TCI) field of the DCI communication indicating a first TCI state and a second TCI state.

20. The UE of claim 14, wherein the instructions are further for the one or more processors to cause the UE to:
    determine the PDSCH mapping type for the first transmission occasion and the second transmission occasion based at least in part on an assumed mapping type matching the PDSCH mapping type.

21. The UE of claim 20, wherein the PDSCH mapping type comprises a mapping type B, and the assumed mapping type comprises the mapping type B.

22. A non-transitory computer-readable medium storing one or more instructions for wireless communication, the one or more instructions comprising:
    one or more instructions that, when executed by one or more processors of a user equipment (UE), cause the UE to:
        receive a downlink control information (DCI) communication that schedules a physical downlink shared channel (PDSCH) including a first transmission occasion and a second transmission occasion and that indicates a PDSCH mapping type used to identify a symbol that is to carry a demodulation reference signal (DMRS), the PDSCH mapping type being for the first transmission occasion and the second transmission occasion; and receive the PDSCH based at least in part on the PDSCH mapping type.

23. The non-transitory computer-readable medium of claim 22, wherein the one or more instructions cause the UE to:

determine the PDSCH mapping type for the first transmission occasion and the second transmission occasion based at least in part on an assumed mapping type.

24. The non-transitory computer-readable medium of claim 23, wherein the assumed mapping type comprises a mapping type B.

25. The non-transitory computer-readable medium of claim 23, wherein, when the PDSCH mapping type is different from the assumed mapping type, the one or more instructions cause the UE to:

identify an error associated with the DCI communication.

26. The non-transitory computer-readable medium of claim 22, wherein the UE is configured to implement a scheme associated with time-division multiplexing of multiple transmission occasions within a single slot.

27. The non-transitory computer-readable medium of claim 22, wherein the one or more instructions further cause the UE to:

determine that the DCI communication schedules the PDSCH including the first transmission occasion and the second transmission occasion based at least in part on a transmission configuration indicator (TCI) field of the DCI communication indicating a first TCI state and a second TCI state.

28. The non-transitory computer-readable medium of claim 22, wherein the one or more instructions further cause the UE to:

determine the PDSCH mapping type for the first transmission occasion and the second transmission occasion based at least in part on an assumed mapping type matching the PDSCH mapping type.

29. An apparatus for wireless communication, comprising:

means for receiving a downlink control information (DCI) communication that schedules a physical downlink shared channel (PDSCH) including a first transmission occasion and a second transmission occasion and that indicates a PDSCH mapping type used to identify a symbol that is to carry a demodulation reference signal (DMRS), the PDSCH mapping type being for the first transmission occasion and the second transmission occasion; and means for receiving the PDSCH based at least in part on the PDSCH mapping type.

30. The apparatus of claim 29, further comprising:

means for determining the PDSCH mapping type for the first transmission occasion and the second transmission occasion based at least in part on an assumed mapping type.

31. The apparatus of claim 30, wherein the assumed mapping type comprises a mapping type B.

32. The apparatus of claim 30, wherein, when the PDSCH mapping type is different from the assumed mapping type, the apparatus comprises:

means for identifying an error associated with the DCI communication.

33. The apparatus of claim 29, wherein the apparatus is configured to implement a scheme associated with time-division multiplexing of multiple transmission occasions within a single slot.

34. The apparatus of claim 29, further comprising:

means for determining that the DCI communication schedules the PDSCH including the first transmission occasion and the second transmission occasion based at least in part on a transmission configuration indicator (TCI) field of the DCI communication indicating a first TCI state and a second TCI state.

* * * * *